(12) United States Patent
Vargantwar et al.

(10) Patent No.: US 8,526,976 B1
(45) Date of Patent: Sep. 3, 2013

(54) DUPLICATIVE TRANSMISSION OF PAGE RECORDS IN A PAGE MESSAGE

(75) Inventors: Sachin R Vargantwar, Overland Park, KS (US); Siddharth S Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 281 days.

(21) Appl. No.: 12/882,371

(22) Filed: Sep. 15, 2010

(51) Int. Cl.
*H04W 68/00* (2009.01)
*H04W 4/00* (2009.01)
*H04B 7/00* (2006.01)

(52) U.S. Cl.
USPC .................. 455/458; 455/426.1; 455/515

(58) Field of Classification Search
USPC ...................... 455/426.1, 458, 515
See application file for complete search history.

(56) References Cited

U.S. PATENT DOCUMENTS

| | | | |
|---|---|---|---|
| 5,369,681 A | 11/1994 | Boudreau et al. | |
| 5,930,706 A | 7/1999 | Raith | |
| 6,181,945 B1 | 1/2001 | Lee | |
| 6,745,039 B1 | 6/2004 | Di Lalla | |
| 7,366,526 B2 | 4/2008 | Zhang et al. | |
| 2005/0207437 A1* | 9/2005 | Spitzer | 370/412 |
| 2006/0251033 A1 | 11/2006 | Oprescu-Surcobe et al. | |
| 2007/0105535 A1 | 5/2007 | Jacobson et al. | |
| 2008/0032713 A1 | 2/2008 | Yang | |
| 2008/0096520 A1 | 4/2008 | Benco et al. | |
| 2008/0293437 A1 | 11/2008 | Ranganathan et al. | |
| 2009/0305728 A1* | 12/2009 | Huang et al. | 455/458 |
| 2010/0210321 A1* | 8/2010 | Tu et al. | 455/574 |

OTHER PUBLICATIONS

"Signaling Link Access Control (LAC Standard) for CDMA2000 Spread Spectrum Systems—Addendum 2", 3GPP2 C.S004-A-2 Version 1.1, Feb. 2002, 230 pages.*
Unpublished U.S. Appl. No. 12/690,629, filed Jan. 20, 2010 entitled "Dynamic Paging Concatenation".
Unpublished U.S. Appl. No. 12/558,359, filed Sep. 11, 2009 entitled "Dynamic Paging Concatenation".
Unpublished U.S. Appl. No. 12/553,661, filed Sep. 3, 2009 entitled "Method and System for Paging a Mobile Station".
Unpublished U.S. Appl. No. 12/572,829, filed October 2, 2009 entitled "Overflow Pages in Heavily Loaded Slots".
Cai et al., "Mitigating DoS Attacks on the Paging Channel by Efficient Encoding in Page Messages," Computer Science Department.
Unpublished U.S. Appl. No. 12/776,287, filed May 7, 2010 entitled "Dynamic Paging for Hybrid Mobile Stations".

(Continued)

*Primary Examiner* — Nimesh Patel
*Assistant Examiner* — Thai Vu

(57) ABSTRACT

Disclosed herein are methods and systems that may take advantage of unused space in general page messages (GPMs) by including multiple instances of a given page in the same GPM, in an effort to improve the chances that the intended mobile station receives the page. An exemplary paging method involves: (a) before a transmission of a general page message (GPM) that is formatted to include up to a maximum number of page records, making a determination that less than the maximum number of page records are scheduled to be included in the GPM; (b) in response to the determination, selecting, from the page records that are scheduled to be included in the GPM, at least one page record for which to include two or more instances in the GPM; and (c) transmitting the GPM, wherein two or more instances of the at least one selected page record are included in the transmission of the GPM.

18 Claims, 6 Drawing Sheets

(56) References Cited

OTHER PUBLICATIONS

Unpublished U.S. Appl. No. 12/786,174, filed May 24, 2010 entitled "Dynamic Paging Concatenation Based on Page-Type".
Unpublished U.S. Appl. No. 12/854,114, filed Aug. 10, 2010 entitled "Dynamic Paging Concatenation Bases on the Likelihood of Roaming".
Unpublished U.S. Appl. No. 12/853,730, filed Aug. 10, 2010 entitled "Reducing the Usage of Non-Preferred Wireless Coverage Areas".
Unpublished U.S. Appl. No. 12/404,846, filed Mar. 16, 2009 entitled "Method and System for Quality-of-Service -Differentiated Reverse Activity Bit".
Unpublished U.S. Appl. No. 12/838,324, filed Jul. 16, 2010 entitled "Prioritization of Final Page Attempt to Mobile Station".

* cited by examiner

FIG. 5A

GPM 500: PR 502, PR 504, PR 506, PR 508, PR 510, PR 512, -, -

FIG. 5B

GPM 500: PR 502, PR 504, PR 506, PR 508, PR 510, PR 512, PR 504, PR 510

DUPLICATIVE TRANSMISSION OF PAGE RECORDS IN A PAGE MESSAGE

BACKGROUND

In a typical cellular wireless communication system, an area is divided geographically into a number of cell sites, each defined by a radio frequency (RF) radiation pattern from a respective base station. The base stations of the cells are then coupled to a switch or gateway (which collectively may be referred to as a "switching system") that provides connectivity with a transport network and/or to a signaling network. When a mobile station (i.e., wireless communication device), such as a cellular telephone, personal digital assistant, pager, or appropriately equipped portable computer, for instance, is positioned in a cell, the mobile station may then communicate via an RF air interface with the base station of the cell. Consequently, a communication path can be established between the mobile station and the network, via the air interface, the base station and the switch. In this way, the base station(s) and switches work in combination to function as a radio access network (RAN), providing mobile stations with RF access to engage in wireless communications, such as telephone calls or Internet communications.

In general, the air interface used for communications from a base station to mobile stations (i.e., the forward link) may be divided into a number of channels, including traffic channels used to carry bearer traffic (e.g., voice or other user data) and control channels used to carry overhead messages. Depending on the wireless technology used, the air interface can be divided into these channels through code division multiplexing (with each channel defined by modulation with a specific code), time division multiplexing (with each channel defined as a segment of time), frequency division multiplexing (with each channel defined by modulation with a specific frequency), and/or some other mechanism.

When a RAN receives a request to connect a call to a mobile station (which may be for various different types of communications, such as voice communications or data communications), the RAN will typically page the mobile station in an effort to determine whether the mobile station is available to receive the call. In practice, for instance, the switching system may direct a base station to broadcast a page to the mobile station over an air-interface paging channel. If the mobile station receives the page, the mobile station typically responds with an acknowledgment message back to the RAN, which would cause the switching system to continue setup of the call to the mobile station.

If a base station has numerous pages to send, then the paging channel can become congested, which may delay call setup or even result in a page not reaching the intended mobile station. As such, base stations commonly group a certain number of pages (that are typically intended for different mobile stations) into a general page message (GPM) for transmission via the paging channel. In this arrangement, each page included in the GPM may take the form of a page record, which is generated by the base station upon receipt of an indication from a switch that an incoming communication has been received for a mobile station. Furthermore, to conserve bandwidth, and so that more pages can be transmitted in a GPM of the same size, each page record in a page message may be concatenated.

OVERVIEW

A radio access network (RAN) is typically configured to format general page messages (GPMs) such that a certain number of page records may be included in each GPM. For example, in a typical CDMA system operating under the IS-2000 protocol, each GPM may be formatted such that up to four page records may be included in a single GPM. Alternatively, page records may be concatenated so that up to eight page records may be included in a single GPM of the same size.

In practice, the number of pages that can be included in a given GPM may be greater than the number of pages that a base station actually needs to send in the GPM. In this scenario, there may be unused space in the GPM. Accordingly, methods and systems are disclosed herein to detect when there is unused space in a GPM, and to take advantage of the unused space to increase the probability that at least one of the page records in the GPM successfully reaches the intended mobile station. In particular, when unused space exists in a given GPM, a base station may use this space to include multiple instances of at least one page record that is already scheduled for transmission in the GPM.

Including multiple instances of a given page record may help to increase the probability that the intended mobile station receives at least one instance of the page record successfully. For example, in the event there is a bit error that affects one instance of a page record in a given GPM, a second instance may still be received by the intended mobile station. It should be understood, however, that exemplary embodiments, in which multiple instances of a page record may be included in a given GPM, may be useful in other scenarios, and may also provide other benefits, without departing from the scope of the invention.

In one aspect, an exemplary paging method involves: (a) before a transmission of a general page message (GPM) that is formatted to include up to a maximum number of page records, making a determination that less than the maximum number of page records are scheduled to be included in the GPM; (b) in response to the determination, selecting, from the page records that are scheduled to be included in the GPM, at least one page record for which to include two or more instances in the GPM; and (c) transmitting the GPM, wherein two or more instances of the at least one selected page record are included in the transmission of the GPM.

In an exemplary method, the selection of the at least one page record for which to include two or more instances may be based on one or more factors, which may include, but are not limited to: (i) a random selection process, (ii) the attempt counts for the one or more of the page records that are scheduled to be included in the GPM, (iii) the page-types of the scheduled page records, (iv) the service-tiers associated with the mobile stations to which the scheduled page records are directed, (v) the RF conditions being experienced by the mobile stations to which the scheduled page records are directed, and (vi) whether or not each of the mobile stations to which the scheduled page records are directed is hybrid mobile station.

In another aspect, an exemplary system may include: (i) a tangible computer-readable medium; and (ii) program instructions stored on the tangible computer-readable medium and executable by at least one processor to: (a) before a transmission of a general page message (GPM) that is formatted to include up to a maximum number of page records, make a determination that less than the maximum number of page records are scheduled to be included in the GPM; (b) in response to the determination, select at least one page record from the page records that are scheduled to be included in the GPM, for which to include two or more instances in the GPM; and (c) initiate the transmission of the GPM, wherein two or more instances of the at least one selected page record are included in the transmission of the GPM.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIGS. 5A and 5B are block diagrams illustrating an exemplary general page message before and after a base station carries out an exemplary method; and FIGS. 6A, 6B, and 6C are block diagrams illustrating another exemplary general page message before and after a base station carries out an exemplary method.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

The present invention will be described by way of example with reference to Code Division Multiple Access ("CDMA") communications in general, and in particular, to communications under EIA/TIA/IS-2000 Rel. 0, A (referred to herein as "IS-2000"). As described below, IS-2000 applies to both circuit-cellular and packet-data communications. Under IS-2000, packet-data communications are referred to as "1X-RTT" communications, also abbreviated as just "1X." However, since IS-2000 supports both circuit voice and packet data communications, the term 1X (or 1X-RTT) is sometimes used to more generally refer to the IS-2000 air interface, without regard to the particular type of communication carried. It should be understood that the present invention may apply to other wireless voice and data protocols including, without limitation, EIA/TIA/IS-856 Rel. 0, A, or other version thereof (referred to as "IS-856" or "EVDO"), IS-95, and GSM, among others.

Exemplary embodiments generally involve including multiple instances of one or more selected page records, when space is available in a GPM to do so. Accordingly, references may be made to including a page record "in duplicate." Referring to a page record as being included "in duplicate" should not be construed to limit the number of instances included in the GPM to two instances. Rather, it should be understood that when a page record is referred to as being including in duplicate, multiple instances (i.e., two or more instances) of the page record may be included in the GPM.

I. Exemplary Network Architecture

Figure 1:
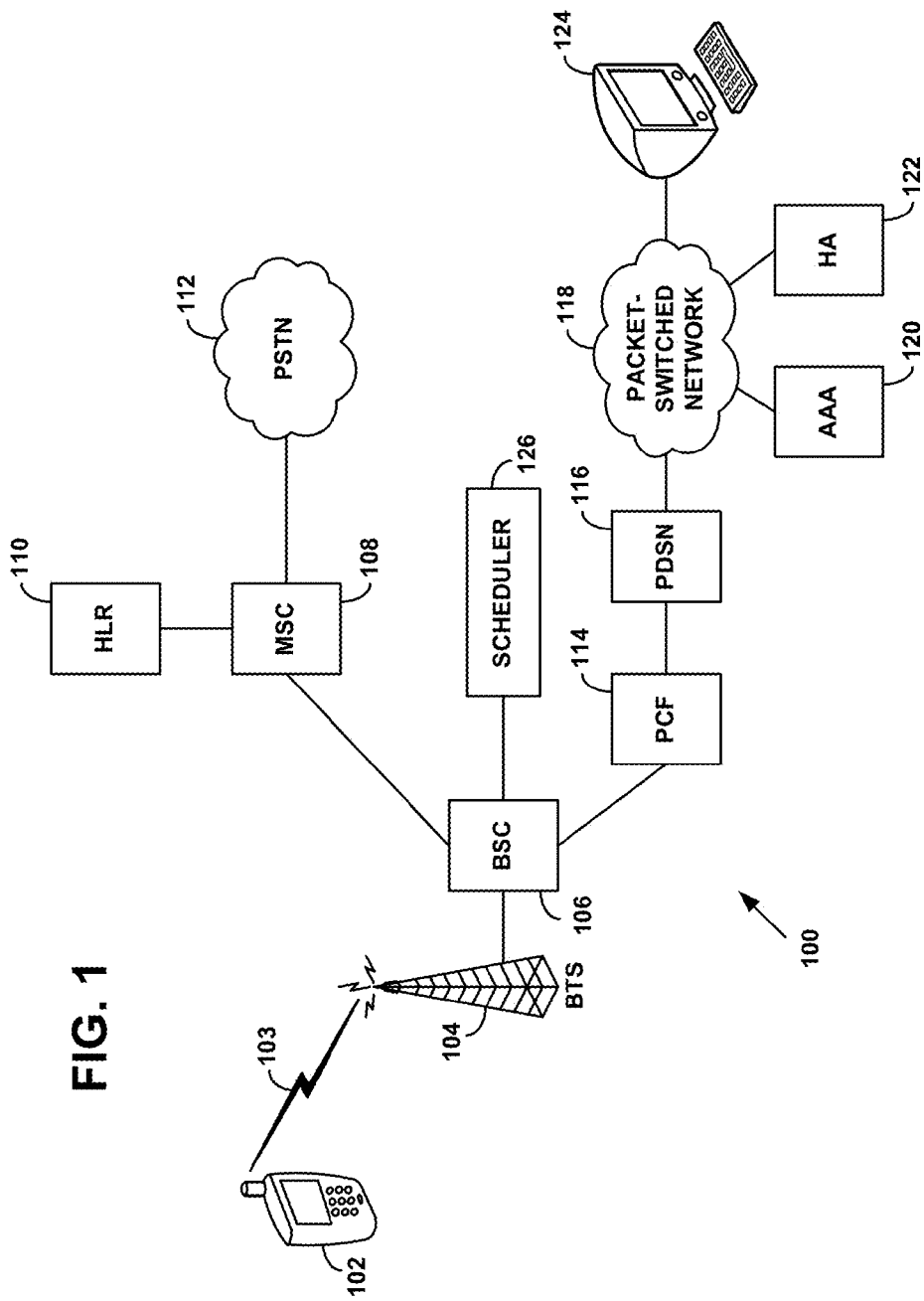
FIG. 1 is a block diagram of a wireless communication system in which an exemplary embodiment may be employed.

FIG. 1 shows a simplified block diagram of a wireless communication system 100 in which an exemplary embodiment may be employed. The communication system 100 is configured to provide wireless service to a mobile station 102, and includes a base transceiver station (BTS) 104, a base station controller (BSC) 106, and a mobile switching center (MSC) 108. BTS 104, BSC 106, MSC 108 may be referred to as part of a larger radio access network (RAN) implemented by a service provider. As shown, mobile station 102 communicates over an air interface 103 with a BTS 104, which is then coupled or integrated with a BSC 106. Transmissions over air interface 103 from BTS 104 to mobile station 102 represent the forward link to the mobile station, while transmissions over interface 103 from mobile station 102 to BTS 104 represent the reverse link.

BSC 106 is in turn connected to MSC 108, which acts to control assignment of air traffic channels (e.g., over air interface 103), and provides access to wireless circuit-switched services such as circuit-voice and circuit-data (e.g., modem-based packet data) service. As represented by its connection to a public switched telephone network (PSTN) 112, MSC 108 is also coupled with one or more other MSCs or other telephony circuit switches in the operator's (or in a different operator's) network, thereby supporting user mobility across MSC regions, and local and long-distance landline telephone services. Also connected to MSC 108 is home location register (HLR) 110, which supports mobility-related aspects of subscriber services, such as dynamic tracking of subscriber registration location and/or verification of service privileges.

As shown, BSC 106 is also connected to a packet data serving node (PDSN) 116 by way of packet control function (PCF) 114. PDSN 116 in turn provides connectivity with a packet-switched network 118, such as the Internet and/or a wireless carrier's private core packet-network. Sitting as nodes on network 118 are, by way of example, an authentication, authorization, and accounting (AAA) server 120, a mobile-IP home agent (HA) 122, and a remote computer 124.

With the arrangement described above, a mobile station 102 can engage in wireless voice and/or wireless packet-data (e.g., 1X-RTT or EVDO) communications. Taking an originating call from mobile station 102 as an example, mobile station 102 first sends an origination request over air interface 103 and via the BTS 104 and BSC 106 to MSC 108. The MSC then signals back to the BSC directing the BSC to assign an air interface traffic channel for use by the mobile station. For a voice call, the MSC uses well-known circuit protocols to signal call setup and establish a circuit connection to a destination switch that can then connect the call to a called device (e.g., landline phone or another mobile station). For a packet-data session, the BSC signals to the PDSN 216 by way of PCF 214. The PDSN 216 and mobile station 102 then negotiate to establish a data link layer connection, such as a point to point protocol (PPP) session. Further, the PDSN 216 sends a foreign agent advertisement that includes a challenge value to the mobile station, and the mobile station 102 responds with a mobile-IP registration request (MIP RRQ), including a response to the challenge, which the PDSN forwards to HA 222. The HA then assigns an IP address for the mobile station 102 to use, and the PDSN passes that IP address via the BSC to the mobile station.

Generally, it should be understood that the depiction of just one of each network element in FIG. 1 is illustrative, and there could be more than one of any of them, as well as other types of elements not shown. The particular arrangement shown in FIG. 1 should not be viewed as limiting with respect to the present invention. Further, the network components that make up a wireless communication system such as system 100 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary mobile station 102 typically comprises a user-interface, I/O components, a communication interface, a tone detector, a processing unit, and data storage, all of which may be coupled together by a system bus or other mechanism.

Throughout this description, the term "base station" may be used to refer to a BTS, a BSC, or a combination of one or more BTSs and a BSC, for instance. Further, it should be understood that actions that are generally described as being carried out by the RAN (or simply by the "network") may be carried out by various different entities or combinations of entities in the RAN. Moreover, actions described as being carried out by one network entity may also be carried out by other network entities, without departing from the scope of the invention.

II. Exemplary Paging Functionality

In each coverage area, the serving BTS 104 preferably broadcasts a specification of paging channels defined in the coverage area, so that a mobile station 102 beginning to operate in the coverage area can determine how many paging channels the coverage area includes and, if more than one, can determine which paging channel to monitor. By way of example, this specification may be an indication in an overhead message referred to as a system parameters message, which the base station broadcasts periodically. Further, the specification may define the paging channels expressly by particular coding parameters or, as noted above may simply indicate how many paging channels there are, which may inherently define the paging channels if a sequence of possible paging channels exists.

A mobile station 102 that has no active data session or voice call (i.e., no assigned traffic channel), but is otherwise operational, is said to be in an "idle" state or mode. While in the idle state, the mobile station 102 periodically scans the air interface for communication from the wireless communication system. More specifically, the mobile station 102 monitors the paging channel for page messages from its serving base station 104 and/or other base stations. Page messages are used to send the mobile station information, alerts, and requests during times when the mobile station isn't engaged in a communication (i.e., when the mobile station is idle). For instance, the mobile station may be alerted of an incoming call or other incoming communications via a page message.

Paging is typically initiated when an MSC 108 receives an indication of an incoming communication for a mobile station, or when the MSC otherwise determines that a mobile station needs to be paged. The indication normally includes an identifier of the mobile station, such as a Network Access Identifier (NAI), a Mobile Directory Number (MDN), a Mobile Identification Number (MIN), an International Mobile Subscriber Identifier (IMSI), an electronic serial number (ESN), and a mobile equipment identifier (MEID). The MSC 108 may then transmit some indication that the mobile station should be paged to the appropriate BTS 104 (or possibly to multiple BTSs). In turn, the BTS 104 may use the mobile-station identifier to generate a page record, which the BTS may then transmit in a coverage area or coverage areas where it believes the mobile station is most likely to receive the page. When a mobile station 102 successfully receives a page, the mobile station may reply to the RAN with a page-response message (PRM). After receiving the PRM, the RAN may then assign the one or more traffic channels to the mobile station.

One metric of the paging effectiveness in a wireless coverage area is the wireless coverage area's paging success rate (PSR). The more often paging procedures in the wireless coverage area result in the successful paging of a WCD, the higher the PSR. PSR may be measured for a coverage area as a whole (i.e., the percentage of all GPMs in a given coverage area to which a WCD responds with a PRM). However, PSR may also be measured on a per-WCD basis (e.g., the percentage of pages to a particular WCD to which the WCD responds with a PRM), on a per-WCD and per-coverage area basis (e.g., the percentage of pages to a particular WCD in a particular coverage area to which the WCD responds with a PRM), or on another basis altogether.

A. General Page Messages

In a further aspect, a RAN, and in particular a BTS 104 in the RAN, may be configured to concurrently page a number of mobile stations in a given sector. To do so, a BTS may be configured to transmit a General Page Message (GPM) that includes multiple page records, with each page record being intended for a different mobile station. (Each "page record" included in a GPM may also be referred to simply as a "page".)

Each page record may contain error detection bits, such as a checksum. Thus, once the mobile station receives such a GPM, it will look for a page record directed to it (e.g., a page record with the mobile station's MIN or IMSI, for instance). If the mobile station determines that it is being paged, the mobile station typically will validate the checksum in the page record. Then, if the checksum indicates that there are no bit errors in the page record, the mobile station may reply to the RAN with a page-response message (PRM). However, if the checksum indicates that one or more bits in the page record are in error, the mobile station may discard the GPM, or possibly indicate to the RAN that there was an error.

Normally, a GPM occupies two half-frames of a paging channel slot, and therefore each paging channel slot would support at most four page records. However, multiple page records within a GPM may be concatenated so that more mobile stations may be paged per GPM. For example, two page records can be concatenated so that they can be transmitted in a single GPM that occupies between two and three half-frames. Further, concatenation schemes may be defined so that even more page records, such as four or eight page records for instance, may be concatenated in a single 80 ms paging-channel slot. Other concatenation schemes involving varying degrees of concatenation are also possible.

B. Page Scheduling

In an exemplary embodiment, each base station (e.g., BTS 104 and/or BSC 106) may include a scheduler 126, which functions to schedule page records received from switches, such as MSC 108, as they are received. As such, the scheduler 126 may function to group page records into GPMs, and schedule the transmission of the GPMs during appropriate paging-channel slots. While the scheduler 126 is shown as being connected to BSC 106, it should be understood that a scheduler may also be connected directly to a BTS 104. It should also be understood that while scheduler 126 is depicted as a separate entity from BTS 104 and BSC 106, a scheduler may be integrated as hardware, software, and or firmware in a BSC or in a BTS. Furthermore, it is possible that a scheduler may be implemented in another configuration altogether (such as a system-wide scheduler, for instance).

In this context, each mobile station 102 is typically assigned a certain slot within the paging slot cycle. For instance, when a mobile station 102 connects to a given base station under IS-2000, the mobile station is typically assigned to a certain slot in the slot cycle based on the mobile station's International Mobile Station Identifier (IMSI). Further, the RAN may implement a "hashing function" that effectively randomizes the selection of slots such that, on average, no one slot in the slot cycle is assigned to substantially more mobile stations than any other slot. Other techniques for assigning slots to mobile stations may be used as well.

Accordingly, to help conserve battery power, a mobile station 102 in the idle state will typically monitor only its assigned slot on a given paging channel. Therefore, during each of its assigned slots, mobile station 102 will scan the paging channel for any possible messages (i.e., pages). For example, when the slot cycle is 5.12 seconds, mobile station 102 will scan the paging channel every 5.12 seconds for any pages directed to the mobile station. In practice, the duration of the scan is typically 80-120 ms, although longer or shorter scans are possible depending on the structure of the paging channel, whether a message has been sent, the length of the message, and the RF conditions on the mobile station's forward link, among other factors.

C. Resending Pages and Zone-Based Paging

In a further aspect of paging, a RAN will typically resend a page (and will potentially do so a number of times) when a page fails to reach (or seemingly fails to reach) a mobile station 102. More specifically, when a mobile station 102 receives a page, it typically responds to the RAN with a page response message. Therefore, if the RAN does not receive the page response, the RAN deduces that a failure of some sort occurred in paging the mobile station. The failure could result from the mobile station being temporarily out of coverage or for some other reason. When this occurs, the switch in the serving system (e.g., MSC 108) preferably attempts to re-page the mobile station. In particular, an MSC 108 may wait a predetermined period of time (ten seconds, for instance) to receive an indication from the BTS 104 that transmitted the page record, which indicates that a page response message has been received from the mobile station 102. If the MSC 108 does not receive such an indication, the MSC will resend the page to BTS 104 to again be transmitted in the coverage area of the BTS. The MSC will repeat this process until a page response message indicates that the page was successfully received or a maximum number of attempts have been made without receiving a page response message. If the maximum number of attempts has been made without a response, then the page may be deemed to have failed.

Furthermore, when a RAN seeks to page a mobile station 102 (e.g., for an incoming call or for some other reason), a switch, such as MSC 108, may send a page to multiple base stations, such as BTS 104, with the hope that when the base stations broadcast the page message in multiple sectors, the mobile station 102 will receive the page message in at least one of the sectors, and will respond. Given the scarcity of paging channel resources in most modern cellular networks, paging across multiple sectors is typically implemented with a more-targeted paging process that is commonly referred to as "zone-based paging."

With zone-based paging, a cellular network is divided into paging zones, each with a respective zone ID, and paging is performed on a zone-basis. To facilitate this, each base station (e.g., BTS 104) in the system may broadcast as one of its overhead parameters the zone ID for the zone in which the base station is located. A mobile station 102 operating in the network may then programmatically monitor the zone IDs indicated in the overhead messages and may automatically register with the network when they detect that they have moved into a new zone, or for other reasons. To register with the network, a mobile station may send a registration message via the access channel in its current sector, and a switch in the network would note the mobile station's registration and convey an indication of the registration to a home location register for later reference.

With this process, the registration records thereby maintained by switches and/or home location registers will indicate the paging zone in which each mobile station last registered. When a switch (e.g., MSC 108) seeks to page a mobile station, the switch may then efficiently send the page message to just those base stations that are within the zone of the mobile station's last registration, as it is likely that the mobile station is in that zone. Further, the switch may send the page message to the base stations in zones adjacent to the mobile station's zone of last registration, to cover the possibility that the mobile station has moved to a new zone but has not yet registered its presence in the new zone.

Using the general paging strategy that is implemented in many RANs providing IS-2000 and/or EVDO service, the network makes up to three attempts to page a mobile station. In particular, the MSC 108 may initiate a first attempt by sending a page record to one or more base stations for transmission in the paging zone in which the mobile station is registered (i.e., the base stations in the paging zone in which the mobile station is registered transmit the page record). Then, if the first attempt is unsuccessful (i.e., the mobile station does not acknowledge the page record), the MSC initiates a second attempt by again sending the page record to the one or more base stations for transmission in the paging zone in which the mobile station is registered, and possibly one or more additional base stations for transmission in one or more adjacent zones as well. If the second attempt also fails, then the MSC initiates a third attempt to page the mobile station, which typically involves sending the page record to multiple base stations for a system-wide transmission of the page record (i.e., in all paging zones), although it is possible that a third attempt may be of a different scope as well.

When a paging scheme that involves re-sending pages is employed, the switch (e.g., MSC 52) from which a page is disseminated may track the "paging-attempt status" of a given page. The paging-attempt status for a given page may include an "attempt count" (i.e., how many attempts have been made by the MSC to send a given page). For example, an MSC 52 may include or have access to database that tracks the paging-attempt status of pages initiated by the MSC. As such, when a page is successfully received at the intended mobile station, and a page response message is received by the base station from which the page was sent, this may be relayed to the switch. The switch then knows not to initiate additional attempts to send the page and refrains from making additional attempts to send the page. On the other hand, if the switch does not receive an indication that the page was successful from any base station, the switch will check the paging-attempt status, and if appropriate, send the page to base stations according to the zone-based paging scheme.

In a further aspect, a switch may be configured to provide the paging attempt status of a given page to the base stations that it sends a page to. For example, an MSC may include in or associate an indication of the attempt count with a page, when it sends a page to a base station. An MSC may provide the paging attempt status of a page to a base station using other techniques as well.

Generally, it should be understood that paging schemes other than zone-based paging may be employed, without departing from the scope of the invention. For instance, a base station may be paged only in the sector in which it is registered, or only in the zone in which it is registered. As such, it is also possible that a base station may the track the paging-attempt status, since such embodiments may not involve coordination between multiple base stations that send a given page, as may be the case in a zone-based paging scheme. Further, it is possible that an exemplary embodiment may be implemented in a system in which no re-paging is performed. In such an embodiment, each page may simply be treated as the last attempt to send a given page.

D. Intersystem Paging

Figure 2:
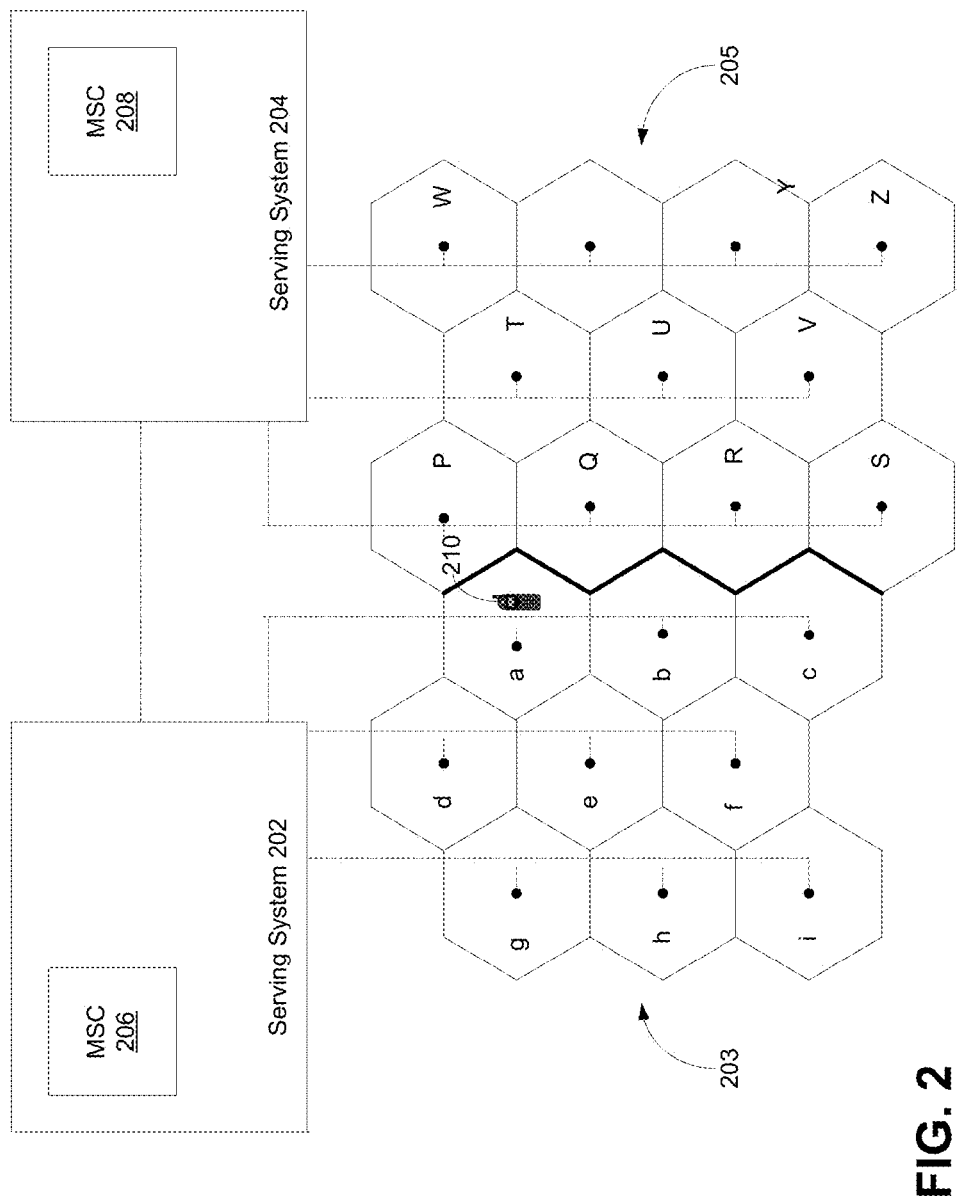
FIG. 2 is a block diagram illustrating a portion of the coverage area in an exemplary radio access network.

In a further aspect, a RAN may also be configured for "intersystem paging" (which may also be referred to as "border cell paging" or "BCP"). Intersystem paging techniques are typically applied when a mobile station is located at or near a border between systems (each "system" including a switch and its corresponding base stations) in a RAN's coverage area. FIG. 2 is a block diagram illustrating a portion of the coverage area in an exemplary RAN, which includes two systems 202 and 204 that serve coverage areas 203 and 205, respectively. In an exemplary embodiment, each system 202 and 204 is controlled by a respective MSC 206 and 208. Each system 202 and 204 provides service in a number of sectors that are served by the respective MSC (via one or more base stations (not shown)). In particular, MSC 206 serves sectors a-i, which collectively may be referred to as coverage area 203, and MSC 208 serves sectors P-Z, which collectively may be referred to as coverage area 205. In coverage area 203, sectors a-c, which are located at the border of the paging zones, are considered to be border sectors, and collectively are considered a border zone within system 202. Similarly, in coverage area 205, sectors P-S are considered to be border sectors, and collectively are considered a border zone within system 204.

When a mobile station is located in a border zone, the serving MSC may be configured to send a page locally (i.e., in the sector or zone in which a mobile is registered), and to additionally send the page to the MSC serving the bordering system. Therefore, the mobile station can also be paged in the bordering system, which may improve service in the event that the mobile station has traveled into the coverage area of the bordering system since it last registered. Accordingly, if the mobile station responds to a page from the serving system, then call setup proceeds normally. If, on the other hand, the mobile station responds to a page from the bordering system, the call may be transferred to the bordering system.

As an example, when a call arrives for a mobile station 210 registered in system 202, the serving MSC 206 may determine if the mobile station was last registered in a border zone (i.e., if the sector in which the mobile station last registered is a border sector). If the mobile station 210 is not registered in a border zone, then the MSC 206 proceeds to page the mobile station as it otherwise would (i.e., sends a page in the sector in which the mobile station is registered, and possibly neighboring sectors as well). In the illustrated scenario, however, the mobile station 210 is registered in sector a, which is in the border zone of system 202. Therefore, in addition to sending the page in sector a (and possibly nearby sectors as well), the MSC 206 sends an "intersystem" page to the MSC 208 serving the bordering system 204. MSC 208 may then send the intersystem page to mobile station 210 in its border zone, which includes sectors P-S (via the base station or base stations serving these sectors). If the mobile station 210 responds to a page from system 202, then the call proceeds normally. If, on the other hand, the mobile station 210 responds to a page from system 204, the call may be transferred to system 204.

In an exemplary embodiment, intersystem paging may be implemented using ISPAGE2 functionality, as defined by the ANSI-41 protocol (which is also referred to as IS-41). As such, intersystem pages may be relayed between systems (i.e., between MSCs) using ISPAGE2 messaging, as specified in ANSI-41. ISPAGE2 and ANSI-41 are well known in the art, and thus not described in detail herein. Further, it should be understood that the term "intersystem page", as used herein, may include any page that sent by an MSC other than the serving MSC. As such, an MSC may identify any page it receives from another MSC, or any page it sends to another MSC, as an intersystem page.

E. Types of Pages

In an exemplary embodiment, pages may be classified as being of a certain "page-type". As used herein, the "page-type" of a page may be defined in a number of different ways. In some embodiments, the page-type may be a function of the type of service (i.e., the type of communication) for which a mobile station is being paged. For example, a page may be for a voice service (i.e., for a voice call other than a voice-over-IP (VOIP) call), a data service (i.e., e-mail, web browsing, Internet-based applications, VOIP, etc.), or possibly for some other type of service. More specifically, in IS-2000 systems, where Service Options (SOs) identify different types of pages, the Service Option of a page may be used to classify a page as either a voice-service page or a data-service page.

As such, a base station may be configured to identify the page-type of a page as, for example, a "voice-service" page or a "data-service" page. In other embodiments, the page-type may be a function of whether or not the page is an "intersystem" page (i.e.; whether the page is being sent by an MSC to which the serving MSC has forwarded the page). And in other embodiments, the page-type may be a function of both the type of service (i.e., the type of communication) for which the mobile station is being paged and whether or not the page is an intersystem page. Other examples are also possible.

Importantly, in exemplary embodiments, a page for an incoming text message, such as a short message service (SMS) or a multimedia messaging service (MMS) message (which, for simplicity, may both be referred to herein as "SMS-service pages" or "SMS pages"), may be classified as a data-service page, treated as a voice-service page, or treated as a distinct type of page unto themselves, according to engineering design choice. More specifically, SMS pages technically notify the recipient mobile station of a data communication, and thus may be treated as data-service pages. However, because an SMS center (SMSC) in a RAN stores the message, and will repeatedly re-initiate a page via a network switch, in the event that previous attempts to send an SMS page to a mobile station have failed, the PSR for SMS messages may be higher than for other types of data communications, and therefore SMS pages may also be treated as voice-service pages, which also tend tends to have a higher PSR than data-service pages. Further, as the PSR for SMS pages may be higher than even the PSR for voice-service pages, SMS pages may be treated as a separate type of page altogether.

IV. Exemplary Embodiments

In an effort to increase the probability that a page to a given mobile station will ultimately reach the mobile station, an exemplary system may be configured to detect when unused space is available in a GPM, and to include multiple instances of a page record in the GPM. An exemplary system may take the form of a tangible computer readable medium having program instructions stored thereon, which may be executed to provide the functionality described herein. An exemplary system may also take the form of an entity or entities in a RAN, such as a switch (e.g., an MSC) or a base station (i.e., one or more BTS and/or a BSC), which includes or has access to such program instructions and thus provides the functionality described herein.

Figure 3:
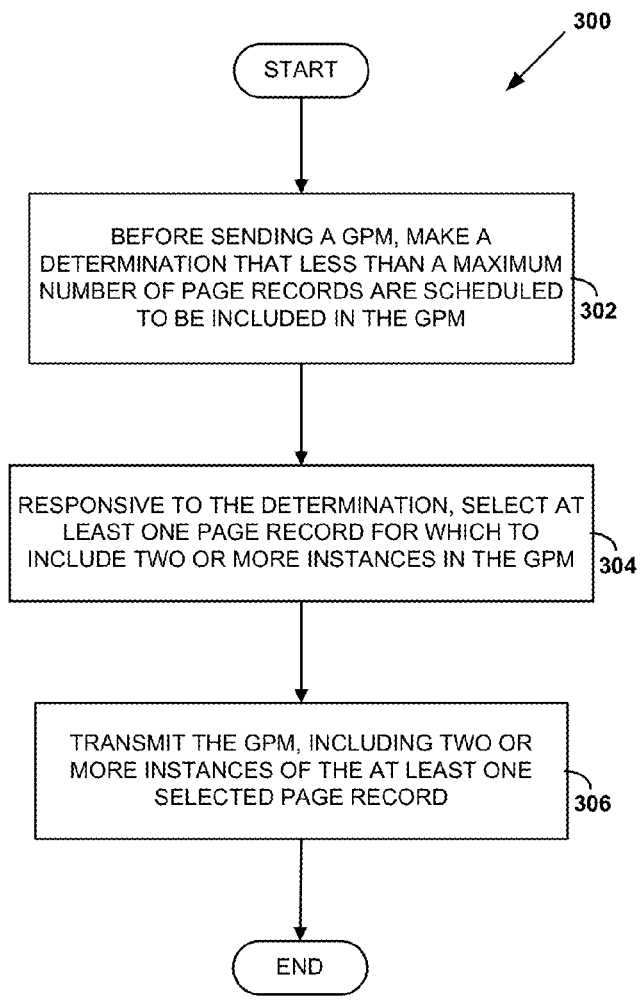
FIG. 3 is flow chart illustrating a method according to an exemplary embodiment.

FIG. 3 is flow chart illustrating a method 300 according to an exemplary embodiment. The method 300 is preferably carried out at a base station in a RAN, and may be implemented to take advantage of unused space in a GPM in order to help increase the paging success rate for one or more mobile stations. As shown by block 302, the method involves a base station, before sending a general page message (GPM), making a determination that less than the maximum number of page records are scheduled to be included in the GPM. When it is determined that less than the maximum number of page records are scheduled, the base station selects at least one page record from the page records that have already been scheduled to be included in the GPM, of which to include two or more instances, as shown by block 304. The base station then transmits the GPM, which accordingly includes two or more instances of the at least one selected page record in the transmission, as shown by block 306.

Generally, when a base station fills all available space in a GPM with duplicate page records before the base station sends the GPM, there is a chance that during the period of time between when the base station selects the page records to include in duplicate and when the base station eventually sends the GPM, the base station may receive an additional page from a switch. In this scenario, there will not be space in the GPM for the additional page, and thus the base station will not be able to include the additional page in the GPM, or will have to remove a duplicate page record to create space for the additional page. Accordingly, in a further aspect, an exemplary method may involve waiting until a predetermined time before the scheduled transmission of a GPM, which is preferably just before the scheduled transmission, before making the determination that less than a maximum number of page records are included in the GPM. By waiting until just before a GPM is sent, the chances of the base station receiving an additional page from a switch after filling the GPM with duplicate page records may be reduced. For instance, in an exemplary method, a base station may wait until the slot that immediately precedes the GPM's scheduled slot before scheduling any page records in duplicate. It should be understood, however, that the timing with which a base station determines that there is available space in a GPM and/or schedules page records to be included in duplicate may vary as a matter of engineering design choice.

In a further aspect, when there is space available more than one page record to be scheduled in duplicate in a given GPM, the number of page records that are included in duplicate may depend upon the space that is available in the given GPM. For example, the base station may determine how many page records can be included in duplicate by subtracting the total number of page records that are scheduled for the GPM from the maximum number of page records, and select the page records to be included in duplicate accordingly. In an exemplary embodiment, if the total number of page records that are scheduled is less than or equal to the number of page records that can be included in duplicate, then the base station preferably includes all the scheduled page records in duplicate. And, if the total number of scheduled page records is greater than or equal to the number of page records that can be included in duplicate, then the base station selects a number of the scheduled page records equal to the number of page records that can be included in duplicate.

Figure 4:
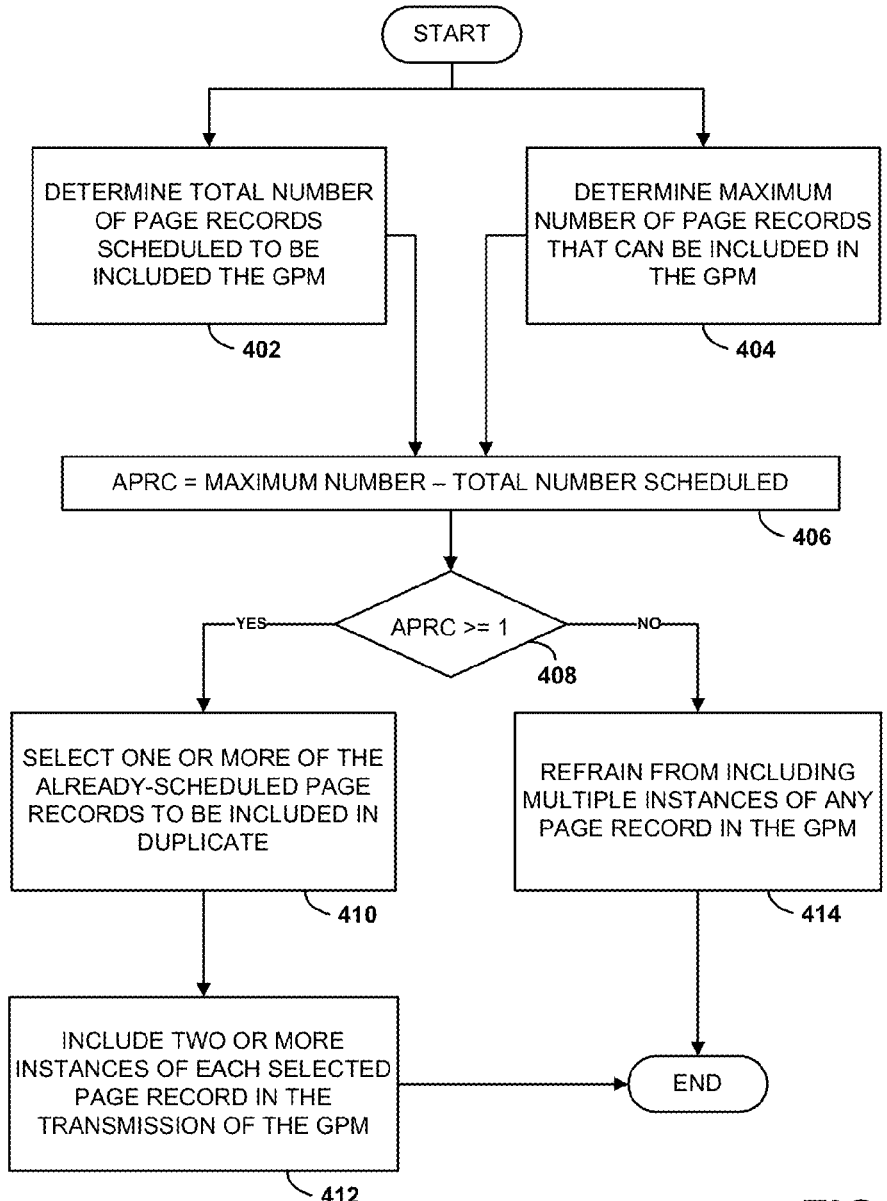
FIG. 4 is flow chart illustrating another method according to an exemplary embodiment.

FIG. 4 is a flow chart illustrating an exemplary method 400, in which the number of page records included in duplicate (if any) is based at least in part upon a determination of unused space in a GPM. More specifically, as shown by block 402, method 400 involves a base station determining the number of page records that are scheduled to be included in the GPM. The base station also determines the maximum number of page records that can be included in the GPM, as shown in block 404. The base station then determines an additional page-record capacity (APRC) of the GPM, which is equal to the maximum number of page records minus the number of page records that are scheduled, as shown by block 406.

The base station then determines whether the APRC is greater than one, as shown by block 408. If the APRC is greater than one, this means that unused space is available for at least page record to be included in duplicate. Accordingly, if the APRC is greater than or equal to one, the base station proceeds to select one or more of the already-scheduled page records to be included in duplicate, as shown by block 410, and to include two or more instances of each selected page record in the transmission of the GPM, as shown by block 412. On the other hand, if the APRC is less than one, then the base station refrains from including multiple instances of any page record in the GPM, as shown by block 414.

FIGS. 5A and 5B are block diagrams illustrating an exemplary GPM 500 before and after a base station carries out an exemplary method. In particular, FIG. 5A shows GPM 500 just before a base station carries out an exemplary method, such as that illustrated by FIG. 4. As shown, six page records (PRs) 502-512 are scheduled for transmission in GPM 500, which is formatted to include up to eight page records. Accordingly, the base station may determine that there is space for up to two additional page records in GPM 500. Since the total number of scheduled page records (six) is greater than the number of page records that can be included in duplicate (two), the base station may select one or two of the scheduled page records to be included in duplicate. For instance, applying method 400 of FIG. 4, the base station may select page records 504 and 510, and include two instances of these page records in GPM 500, as shown by FIG. 5B.

Figures 6A, 6B, 6C:
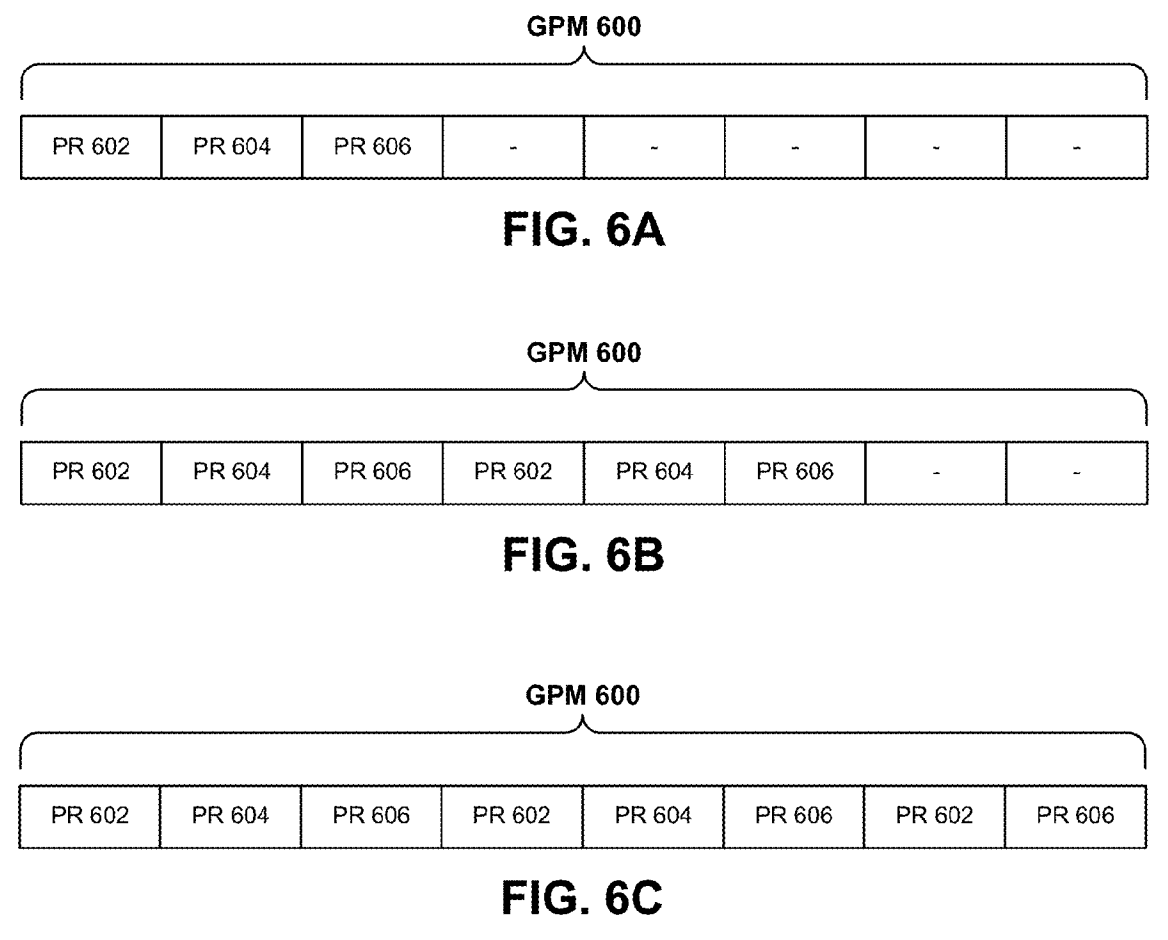

As another specific example, FIGS. 6A and 6B are block diagrams illustrating another exemplary GPM 600 before and after a base station carries out an exemplary method. In particular, FIG. 6A shows GPM 600 just before a base station carries out an exemplary method. As shown, GPM 600 is formatted to include up to eight page records. However, only three page records (PRs) 602-606 are scheduled for transmission in GPM 600. Accordingly, the base station may determine that there is space for up to five additional page records in GPM 600. And since the total number of page records that are scheduled (three) is less than the number of page records that can be included in duplicate (five), the base station schedules all three page records 602-606 in duplicate, as shown in FIG. 6B.

In a further aspect, when the total number of page records that are scheduled in a GPM is less than the number of page records that can be included in duplicate, as is the case in FIG. 6A, more than two instances of some (or even all) of the page records may be included. For example, as shown in FIG. 6B, when all three page records 602-606 are included in duplicate, there is still space available for two more page records in the GPM. Accordingly, the base station may include additional instances of scheduled page records in order to fill the available space in the GPM, in an effort to further increase the PSR for the scheduled pages. For example, the base station may include three instances of page records 602 and 606, and two instances of page record 604, as shown in FIG. 6C. Other examples are also possible.

When not all scheduled page records can be included in duplicate, as is the case in FIG. 5B, the particular page records to be included in duplicate may be selected using processes described herein, or possibly using another process altogether. Accordingly, an exemplary method may further involve a selection process to determine which scheduled page records should have multiple instances included. In general, the selection process may be a matter of engineering design choice, and based on various criteria. For example, in a basic embodiment, a random selection process may be used to randomly select page records to be included in duplicate (or in triplicate, and so on). Preferably, however, the selection process is a process in which the page records are prioritized based on various factors, such that the highest-priority sectors can be included in duplicate. For example, if space is available for three page records, the page records having the three highest priorities may be selected.

Some of the factors that may be used to prioritize page records for inclusion in duplicate will now be described. These factors may each be used alone or in combination with one or more other factors. Further, other factors may be used in addition, or in the alternative, to those described below. And in general, it should be understood that any selection process may be incorporated, without departing from the scope of the invention.

A. Page-Record Selection Based on Attempt Count

In some embodiments, the selection of page records for which to include multiple instances may be based, at least in part, on the respective attempt counts of the already-scheduled page records. For example, when the transmission of a GPM will constitute the last attempt at sending a page record included therein, such a page record may be prioritized, and two or more instances of the page record may be included in the GPM, with the hope being that doing so will increase the chances that the intended mobile station successfully receives the page record.

More generally, page records having a higher attempt count may be given priority over page records having a lower attempt count. For instance, in a RAN configured to make up to three attempts to send a given page, a page record that represents the third and final attempt to page a mobile station may be given priority over a page record that represents the second attempt or the first attempt to page a mobile station. Likewise, a page record that represents the second attempt to page a mobile station may be given priority over a page record that represents the first attempt to page a mobile station. For example, referring back to FIG. 5A, and in particular to the six scheduled page records 502-512 of GPM 500, consider a scenario where page records 502, 504, and 510 each represent the third attempt to page the respective intended mobile station, page record 506 represents the second attempt to page the intended mobile station, and page records 508 and 512 each represent the first attempt to page the respective intended mobile station. Accordingly, page records 502, 504, and 510 may be given priority over page records 506, 508, and 512, and page record 506 may be given priority over page records 508 and 512.

To facilitate the determination of the attempt count for a given mobile station, an exemplary base station may include or have access to a database storing attempt-count data on a per-mobile station basis. For example, whenever a page intended for mobile station is forwarded to a base station from an MSC, the base station may transmit the page and check the database to determine if an entry exists for the mobile station. If no entry exists for the mobile station, then the base station creates an entry for mobile station and increments the attempt count for the mobile station (e.g., from zero attempts to one attempt). If an entry does exist for mobile station, then the base station updates the entry by incrementing the attempt count (e.g., from one attempt to two attempts, or from two attempts to three attempts). Accordingly, to determine whether or not multiple attempts have been made to page a given mobile station, a given base station may simply access the attempt-count data for the mobile station and determine how many attempts have been made.

Further, a RAN may be configured to reset the attempt count for a given mobile station (or alternatively, simply delete the database entry for the mobile station) in a number of circumstances. Generally, a RAN will reset the attempt count (or delete the attempt count data) for a given mobile station when a page is successfully received by the mobile station or fails to reach the mobile station (i.e., when the maximum number of attempts are made without success). This allows for the attempt count to start anew for subsequent pages to the same mobile station. As such, a base station preferably resets the attempt count for a mobile station whenever the base station receives a page response message from mobile station indicating that the mobile station successfully received the page.

Further, in some paging schemes (such as the typical zone-based paging scheme described herein), multiple base stations may transmit a page concurrently, making it possible that the one base station may successfully page a mobile station, while another is unsuccessful. As such, an MSC may notify a base station that unsuccessfully attempts to send a page when another base station is successful in doing so. Accordingly, a base station may also reset its attempt count for a given mobile station when it receives a message from an MSC (or another RAN entity) indicating that the base station should reset the attempt count for a given mobile station. In some embodiments, a message from the MSC that indicates that a base station should reset the attempt count for a given mobile station, may simply indicate that a page to mobile station was successful (which in turn indicates that the attempt count should be reset in order to avoid the attempt count carrying over to future pages to the mobile station), or that the page failed (i.e., the maximum number of attempts have been made without receiving a page response message at any base station).

Additionally or alternatively, a base station may implement an attempt timer, which the base station starts when a first attempt to page a mobile station is made. The base station may then reset the attempt count for the mobile station when the attempt timer expires.

In using the relative attempt counts of the page records as a basis for prioritizing the page records, the attempt count may be measured on a per-zone basis (i.e., the number of attempts made in the zone in which the base station carrying out the selection process is located) or on a per-page-record basis (i.e., the total number of attempts in any zone, or in other words, the paging-attempt status as described herein). This distinction may be important, as it is possible that the paging-attempt status maintained at the MSC may differ from the attempt count maintained by a given base station. For example, the first paging attempt in a given zone may actually be the second or third paging attempt overall, and thus the paging-attempt status stored at the MSC may indicate that, on a per-page-record basis, it is the second or third attempt, whereas the attempt count stored at the base station may indicate that, on a per-zone basis, that it is the first attempt to send the page in the given zone.

B. Page-Record Selection Based on Page-Type

In practice, the PSR may also vary between different types of pages. For example, it has been observed that the success rate of voice pages (i.e., pages indicating an incoming voice communication for a mobile station) is typically higher than the success rate for data pages (i.e., pages indicating an incoming data communication for a mobile station). This is due, at least in part, to the fact that data-service pages may be shed in favor of voice-service pages at times when the paging channel is highly congested.

Furthermore, the PSR for intersystem pages is typically lower than the PSR for pages sent by a switching system serving the coverage area in which a mobile station is registered. Specifically, because intersystem pages are typically sent to mobile stations located in border zones between switching systems, the mobile stations may "ping-pong" between systems (i.e., repeatedly switch back and forth between the systems). In this scenario, there is a greater probability that a mobile station will disconnect from a system before it receives a page, which in turn may decrease the PSR for intersystem pages.

Accordingly, the selection of those page records for which to include multiple instances may be additionally or alternatively based on the page-type of a given page record. For example, since the PSR for voice-service pages is typically higher than the PSR for data-service pages, data-service page records may be given priority over voice-service pages when selecting page records to be included in duplicate. Furthermore, since the PSR is typically lower for intersystem pages, intersystem pages may be given priority over non-intersystem pages when selecting page records to be included in duplicate.

To facilitate selection based on page-type, a RAN may use various techniques to determine the page-type for a given page record. For example, an exemplary GPM may have a number of parameters, including a SERVICE_OPTION (SO) parameter that indicates the type of service for which the mobile station is being paged, and which an MSC may provide to a base station when it indicates that a mobile station needs to be paged. Therefore, a base station may determine the page-type from the SERVICE_OPTION parameter. In an exemplary embodiment, this may involve classifying the page as either a voice-service page or a data-service page based on the SERVICE_OPTION parameter. For example, the following table shows various Service Options codes that are defined under IS-95 and IS-2000.

| Service Option | Service |
| --- | --- |
| SO1 | Basic Variable Rate Voice Service (8 kbps) |
| SO2 | Mobile Station Loopback (8 kbps) |
| SO3 | Enhanced Variable Rate Codec (EVRC) Voice Service (8 kbps) |
| SO6 | Short Message Services (Rate Set 1) |

-continued

| Service Option | Service |
| --- | --- |
| SO9 | Mobile Station Loopback (13 kbps) |
| SO14 | Short Message Services (Rate Set 2) |
| SO17 | High Rate Voice Service (13 kbps) |
| SO32 | Test Data Service Option (TDSO) |
| SO33 | cdma2000 High Speed Packet Data Service, Internet or ISO Protocol Stack |
| SO55 | Loopback Service Option (LSO) |
| SO68 | EVRC-B Voice Service (8 kbps) |
| SO70 | EVRC-WB Voice Service (8 kbps) |
| SO32768 | Proprietary Service Option (Qualcomm Inc.) |

According to an exemplary embodiment, the following Service Options codes may be classified as voice-service pages: SO1 (Basic Variable Rate Voice Service (8 kbps)), SO3 (Enhanced Variable Rate Codec (EVRC) Voice Service (8 kbps)), SO17 (High Rate Voice Service (13 kbps)), SO68 (EVRC-B Voice Service (8 kbps)), SO70 (EVRC-WB Voice Service (8 kbps)), and SO32768 (Proprietary Service Option for Qualcomm Inc.). Further, Service Options codes indicating data-service pages may include: SO2 (Mobile Station Loopback (8 kbps)), SO9 (Mobile Station Loopback (13 kbps)), SO55 (Loopback Service Option (LSO)), SO32 (Test Data Service Option (TDSO)), and SO33 (CDMA2000 High Speed Packet Data Service, Internet or ISO Protocol Stack).

Further, SO6 (Short Message Services (Rate Set 1)) and SO14 (Short Message Services (Rate Set 2)) may be classified as SMS pages. As noted, SMS pages may be treated as voice-service pages, data-service pages, or as their own distinct page-type. Accordingly, in an exemplary embodiment, SO6 and SO14 may be treated in this manner.

Yet further, while a page record in an exemplary embodiment may take the form of a page record in a GPM, and identify the type of communication using the SERVICE_OPTION parameter, it should be understood that a page may take any form, and identify the type of communication in any manner, without departing from the scope of the invention.

Additionally or alternatively, a RAN may determine whether a page record is an intersystem page using various techniques. For example, an MSC may deem any page forwarded to it by another MSC to be an intersystem page. Further, to notify a base station whether or not a page is an intersystem page, an exemplary MSC may be configured to include an intersystem indicator as part of, or in conjunction with the transmission of a page record. For instance, the MSC may include an intersystem bit in the page record, which is set to "1" if the page record was forwarded to the MSC from another MSC (e.g., if the MSC did not itself create the page record), and set to "0" if the MSC itself created the page record. As such, when a BTS receives a page record, it may check the intersystem indicator as a basis for determining the page-type. However, it should be understood that an access network may identify a page as an intersystem page using any technique, without departing from the scope of the invention.

In a further aspect, page-type may be based on more than one factor. For example, page-type may be a function of the type of service (e.g., data or voice) and whether or not a page is an intersystem page. Accordingly, the RAN may prioritize a page record for inclusion in duplicate based on whether the page record is an intersystem voice-service page, an intersystem data-service page, a non-intersystem voice-service page, or a non-intersystem data-service page. Other variations, which may define page-type based on other and/or additional factors, are also possible.

C. Page-Record Selection Based on QoS Tiers

A cellular-network service provider may offer multiple service tiers to its subscribers which provide varying quality-of-service (QoS) levels. Each service tier may specify, for example, particular services, applications, etc. that are available to a subscriber, the maximum bandwidth that is available to the subscriber for the various services, applications, etc., and/or the subscriber's priority for certain network resources. In an exemplary embodiment, service tiers may be used to provide QoS-differentiated service, and as such, the service tiers may take the form of QoS tiers. Mobile stations may therefore be required to gain authorization for a given QoS tier before receiving service or accessing services and resources that are designated for the QoS tier.

When a service provider has implemented QoS tiers, the selection of those page records for which multiple instances should be included may additionally or alternatively be based on the QoS tier of the mobile station for which the page record is intended. In particular, a page record intended for a mobile station having a higher relative QoS tier (i.e., a mobile station registered to a subscriber account where the subscriber has paid for the higher QoS tier), may be given priority as compared to a mobile station having a lower relative QoS tier.

As a specific example, a service provider may provide three QoS tiers, which, for simplicity, may be referred to as the Gold, Silver, and Bronze tiers. The Gold tier may provide the highest QoS, while the Bronze tier provides the lowest QoS and the Silver tier provides intermediary QoS. Accordingly, Gold-tier users may be authorized for more services, better access to services, access to more bandwidth, guaranteed bandwidth, etc., as compared to Silver-tier users and Bronze-tier users. As such, when a page record intended for a mobile station of a Gold-tier subscriber may be given priority for inclusion in duplicate over page records intended for Silver-tier and Bronze-tier subscribers. Similarly, a page record intended for a mobile station of a Silver-tier subscriber may be given priority for inclusion in duplicate over a page record intended for a Bronze-tier subscriber. Other examples are also possible, as QoS tiers may be defined by service providers based on any number of factors.

D. Page-Record Selection Based on Mobile-Station RF Conditions

When a mobile station is already experiencing poor radio frequency (RF) conditions, and thus may have a weak connection to a RAN, the chances of the mobile station receiving a page may be reduced. Accordingly, the selection of page records for which to include multiple instances may be additionally or alternatively based on an indication or indications of the RF conditions being experienced by the mobile station that is being paged. In particular, page records intended for mobile stations experiencing less-favorable RF conditions may be given priority over page records intended for mobile stations experiencing more-favorable RF conditions.

The indication or indications of the RF conditions experienced by a mobile station may take various forms. For instance, RF quality often degrades when a mobile station is located near the edge of a sector. Accordingly, a base station may determine that a mobile station is located near the edge of a sector, and consider this determination to indicate that RF conditions for the mobile station are less favorable. On the other hand, a base station may interpret a determination that a mobile station is not located in a border area (i.e., not near the edge of a sector) to indicate that the mobile station is experiencing more-favorable RF conditions.

In one embodiment, a base station may determine that a mobile station is near the edge of a sector by determining the elapsed time since a last-received zone-based registration message from the mobile station. Since zone-based registration messages are sent whenever a mobile station enters a new sector (and thus are assumed to have been sent when the mobile station was at or near the edge of the sector), the base station may interpret a determination that the elapsed time is less than a certain threshold as an indication that the mobile station is near the edge of a sector, and thus likely to be experiencing less favorable RF conditions. The base station may then give priority to such mobile stations, in an effort to increase the probability that the mobile station receives the page.

In other embodiments, a base station may additionally or alternatively utilize other indications of the RF conditions for a mobile station to prioritize for inclusion in duplicate. For example, the base station may use parameters included in a radio-environment report (RE-Report) from a mobile station that are indicative of RF quality. In particular, the RAN may give priority to page records intended for mobile stations having lower relative signal strength, as indicated by the ACTIVE_PILOT_STRENGTH parameter in the last-received RE-Report from the respective mobile stations.

Further, the above indications of the RF conditions being experienced by a mobile station may be used in combination with other indications of the RF conditions a mobile station is experiencing. And in general, a base station may use any indication or indications of the quality of the RF signal being experienced by the mobile station, without departing from the scope of the invention. Further description of how a RAN may determine the RF conditions being experienced by a mobile station may be determined is provided in the co-owned U.S. patent application Ser. No. 12/690,629, which is incorporated by reference herein in its entirety.

E. Page-Record Selection Based on Hybrid Capabilities of a Mobile Station

In some wireless communication systems or markets, a wireless service provider may implement more than one type of air interface protocol within a single system. For example, a carrier may support one or another version of CDMA, such as IS-2000, for both circuit-cellular voice and data traffic, as well as a more exclusively packet-data-oriented protocol such as IS-856. In such a "hybrid system," a mobile station might not only hand off between coverage areas under a common air interface protocol (e.g., between IS-2000 sectors) but may also hand off between the different air interface protocols, such as between IS-2000 and IS-856. A mobile station capable of communicating on multiple air interface protocols of a hybrid system is referred to as a "hybrid mobile station."

In typical operation, a hybrid mobile station remains in an IS-2000 idle state (i.e., is registered with the IS-2000 system), while it is engaged in an IS-856 call. As such, the mobile station continues to monitor the paging and control channels in the IS-2000 system, in search of any incoming pages, voice calls, SMS messages, or the like, and to monitor IS-2000 pilot signals. More specifically, during an active IS-856 communication (i.e., data session), a mobile station has its antenna and receiver tuned to the RF frequency of the IS-856 interface. However, in order to scan the IS-2000 interface according to its assigned paging slot (e.g., every 5.12 seconds), the mobile station must periodically tune to the RF frequency of the IS-2000 interface and tune away from the IS-856 interface for the duration of the scan interval. These slot-cycle scans, commonly referred to as "tuneaway scans," can have an impact on quality and throughput of IS-856 communications.

In the event that a hybrid mobile station does not receive a GPM during its assigned paging slot cycle, it will wait for additional paging slot cycles until it receives a GPM. In current hybrid systems, a drop-call timer may expire while the mobile station waits, which causes the IS-856 communication to be dropped. Under IS-856, when the serving base station does not receive any DRC messages from the mobile station for three consecutive time slots (i.e., 240 ms), the base station starts a drop-call timer, which is typically eight to ten seconds in duration. When the drop-call timer expires, the base station ends the communication (i.e., the call is dropped). For example, when the mobile station tunes away to listen for an IS-2000 page message, the mobile station is no longer communicating on the IS-856 interface, and thus will cease sending DRC messages to the access network on the IS-856 interface. When the serving IS-856 base station does not receive any DRC message for three consecutive frames (i.e., 240 ms), the base station starts a drop-call timer, which in practice, is typically eight to ten seconds in duration.

If a hybrid mobile station receives a page record as expected, then the mobile station may tune back to the IS-856 and continue its call. However, if the mobile station does not receive a page message, and remains tuned away until a page message is received, the drop-call timer may expire, causing the call to be dropped. For example, if the drop-call timer is eight seconds, and the mobile station has to wait 10.24 seconds for two page slot cycles (5.12 seconds each) or longer before it successfully receives a page message, the drop-call timer will expire and the IS-856 call may be dropped. Other examples are also possible, and it should be understood that an exemplary embodiment may be implemented in conjunction with a drop-call timer of any duration.

In view of the foregoing, it may be desirable to prioritize page records intended for hybrid mobile station, in an effort to increase the probability that a hybrid mobile station receives a page, and avoids the above scenario where a call may be dropped. Accordingly, the selection of page records for which to multiple instances should be included may be additionally or alternatively be based on whether or not the mobile station for which the page is intended is a hybrid mobile station.

To determine whether or not a given mobile station is a hybrid mobile station, the access network may perform a look-up, based on the mobile station's identifier, such as the Electronic Serial Number (ESN) of the mobile station, which is typically a 32-bit number that is assigned by the manufacturer of the mobile station and uniquely identifies the mobile station. Accordingly, each switch in the access network (e.g., each MSC) may include a database that maps the access-terminal identifier (e.g., the ESN) to the model number and capabilities of the model, including whether or not it is capable of hybrid IS-2000/IS-856 operation. In practice, this database is typically populated and/or updated by the service provider, although it may be maintained and/or created in any manner, and may be stored in an entity other than a switch, without departing from the scope of the invention. It should be understood, however, that any technique may be used to determine whether or not a mobile station is a hybrid, without departing from the scope of the invention.

F. Selection from Between Page Records Having Equal Priority

It is possible that even after a base station considers some or all of the factors described above, the number of page records having a priority that qualifies them to have multiple instances included may still be greater than the number of spaces available for duplicate instances of page records having the given priority. In this scenario, the base station may resort to a random selection process to select from the page records having the same priority.

For instance, referring back to FIG. 4A, since six page records 402-412 are included in GPM 400, there is only space for up to two page records to be included in duplicate. However, consider a scenario where there are three page records 402, 404, and 410 that represent the third and final attempt to page the respective intended mobile stations. As such, the base station must select two of these three page records 402, 404, and 410, which based on attempt count alone, are of equal priority. The base station may simply use a random selection process, and/or may use any of the other factors described herein, alone or in combination, to select between page records having the same priority.

It should be understood that before resorting to random selection, an exemplary base station may go through a hierarchy of factors, in an effort to prioritize the scheduled page records. For example, consider a GPM that is formatted to include up to eight page records, and which initially includes one page record that represents the third attempt to page a mobile station, three page records that represent the second attempt to page the respective mobile stations, and one page record that represents the first attempt to page a mobile station. Further, the three page records that represent a second attempt are all intended for mobile stations associated with a subscriber who has paid for a Gold-tier QoS plan, and are all being sent in effort to initiate a voice call. As there is space in the GPM for up to three page records to be included in duplicate, the base station may first select the page record that represents the third attempt, as according to an exemplary embodiment, this page record has priority over those page records that represent the second attempt or first attempt to page a mobile station. This leaves space for two of the three page records that represent a second attempt to be included in duplicate.

Since there are three page records that all represent a second attempt to page a mobile station, the base station needs to determine which two of these three page records should be included in duplicate. Accordingly, the base station may step through a hierarchy of one or more additional factors in an attempt to prioritize these three page records. For example, when one or more page records need to be selected from among page records having the same attempt number, the base station may be configured to use page-type as a selection factor. Further, when one or more page records need to be selected from among page records having the same attempt number and the same page-type, the base station may be configured to use the QoS level associated with the mobile station as a selection factor.

In the above example, even after stepping through the hierarchy of attempt count, page-type, and QoS level, there are three page records that have the same priority, and all qualify to be one of the two remaining page records included in duplicate. Therefore, since no definite selection results even after the base station considers the additional factors, the base station may resort to a random selection process in order to select the two of these three page records to be included in duplicate.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A paging method in a radio access network, the method comprising:

before a transmission of a general page message (GPM) that is formatted to include up to a maximum number of page records, making a determination that less than the maximum number of page records are scheduled to be included in the GPM;

in response to the determination that less than the maximum number of page records are scheduled to be included in the GPM, selecting, from one or more page records that are scheduled to be included in the GPM, at least one page record for which to include two or more instances in the GPM, wherein the selecting of the at least one page record for which to include two or more instances in the GPM is based at least in part on a comparison of page-types of the scheduled page records; and transmitting the GPM, wherein two or more instances of the at least one selected page record are included in the transmission of the GPM.

2. The method of claim 1, wherein the maximum number of page records is eight.

3. The method of claim 1, wherein the GPM is transmitted in an 80 ms paging-channel slot.

4. The method of claim 1, further comprising waiting until a predetermined time before transmission of the GPM is scheduled, before making the determination that less than a maximum number of page records are included in the GPM.

5. The method of claim 1, wherein making the determination that less than the maximum number of page records are scheduled to be included in the GPM:

determining a total number of page records that are scheduled to be included in the GPM; and determining that the total number of page records that are scheduled to be included in the GPM is less than the maximum number of page records.

6. The method of claim 5, wherein selecting, from the page records that are scheduled to be included in the GPM, the at least one page record for which to include two or more instances in the GPM comprises:

determining a number of page records that can be included in duplicate by subtracting the total number of page records that are scheduled to be included in the GPM from the maximum number of page records; and from the page records that are scheduled to be included in the GPM, selecting up to the number of page records that can be included in duplicate, to be included in duplicate in the GPM.

7. The method of claim 6, wherein selecting up to the number of page records that can be included in duplicate comprises:

if the total number of page records that are scheduled to be included in the GPM is less than or equal to the number of page records that can be included in duplicate, then selecting all the scheduled page records that are scheduled to be included in the GPM; and if the total number of page records that are scheduled to be included in the GPM is greater than or equal to the number of page records that can be included in duplicate, then selecting a number of the scheduled page records equal to the number of page records that can be included in duplicate.

8. The method of claim 1, wherein the selecting of the at least one page record for which to include two or more instances in the GPM is further based at least in part on a random selection process.

9. The method of claim 1, wherein the selecting of the at least one page record for which to include two or more instances in the GPM is further based at least in part on attempt counts for the one or more of the page records that are scheduled to be included in the GPM.

10. The method of claim 1, wherein the selecting of the at least one page record for which to include two or more instances in the GPM is further based at least in part on a comparison of service-tiers associated with the mobile stations to which the scheduled page records are directed.

11. The method of claim 1, wherein each of the scheduled page records wherein the selecting of the at least one page record for which to include two or more instances in the GPM is further based at least in part on RF conditions being experienced by the mobile stations to which the scheduled page records are directed.

12. The method of claim 1, wherein the selecting of the at least one page record for which to include two or more instances in the GPM is further based at least in part on whether or not each of the mobile stations to which the scheduled page records are directed is hybrid mobile station.

13. A paging system comprising:

a tangible computer-readable medium; and program instructions stored on the tangible computer-readable medium and executable by at least one processor to:

(a) before a transmission of a general page message (GPM) that is formatted to include up to a maximum number of page records, make a determination that less than the maximum number of page records are scheduled to be included in the GPM;

(b) in response to the determination that less than the maximum number of page records are scheduled to be included in the GPM, select at least one page record from one or more page records that are scheduled to be included in the GPM, for which to include two or more instances in the GPM, wherein the selection of the at least one page record for which to include two or more instances in the GPM is based at least in part on a comparison of page-types of the scheduled page records; and (c) initiate the transmission of the GPM, wherein two or more instances of the at least one selected page record are included in the transmission of the GPM.

14. The system of claim 13, wherein selection of the at least one page record for which to include two or more instances in the GPM is further based at least in part on a random selection process.

15. The system of claim 13, wherein selection of the at least one page record for which to include two or more instances in the GPM is further based at least in part on attempt counts for the one or more of the page records that are scheduled to be included in the GPM.

16. The system of claim 13, wherein selection of the at least one page record for which to include two or more instances in the GPM is further based at least in part on a comparison of service-tiers associated with the mobile stations to which the scheduled page records are directed.

17. The system of claim 13, wherein each of the scheduled page records wherein selection of the at least one page record for which to include two or more instances in the GPM is further based at least in part on RF conditions being experienced by the mobile stations to which the scheduled page records are directed.

18. The system of claim 13, wherein each of the scheduled page records wherein selection of the at least one page record for which to include two or more instances in the GPM is further based at least in part on whether or not each of the mobile stations to which the scheduled page records are directed is hybrid mobile station.

* * * * *